United States Patent [19]
Kelley, Jr.

[11] 3,992,661
[45] Nov. 16, 1976

[54] REACTIVE CURRENT COMPENSATING APPARATUS FOR ELECTRIC POWER SYSTEMS

[75] Inventor: Fred W. Kelley, Jr., Media, Pa.

[73] Assignee: General Electric Co., Phila., Pa.

[22] Filed: Aug. 25, 1975

[21] Appl. No.: 607,652

[52] U.S. Cl. .............................. 323/102; 323/119; 323/124
[51] Int. Cl.² ............................................. H02J 3/18
[58] Field of Search .................. 13/12, 13; 323/101, 323/102, 105, 106, 108, 119, 121, 124, 127, 128

[56] References Cited
UNITED STATES PATENTS
1,991,063  2/1935  Rudenberg.......................... 323/124
3,900,792  8/1975  Moltgen.......................... 323/119 X OTHER PUBLICATIONS
Johnson et al., "Static High-Speed Var Control for Arc Furnace Flicker Reduction", Reprinted from vol. 34, Proceedings of the American Power Conf., 1972, pp. 1102, 1103, 323–324.

Primary Examiner—A. D. Pellinen
Attorney, Agent, or Firm—J. Wesley Haubner

[57] ABSTRACT

A reactive current compensator for improving the power factor of a multiphase alternating current electric power circuit comprises a bank of fixed capacitors connected to multiphase line terminals in star circuit relation and two multiphase banks of fixed inductors connected to said terminals in parallel circuit relation, one inductor bank being star-connected and the other being ring connected, together with switching means responsive to a characteristic of power circuit current for controlling the magnitude of current in each phase of both inductor banks.

6 Claims, 1 Drawing Figure

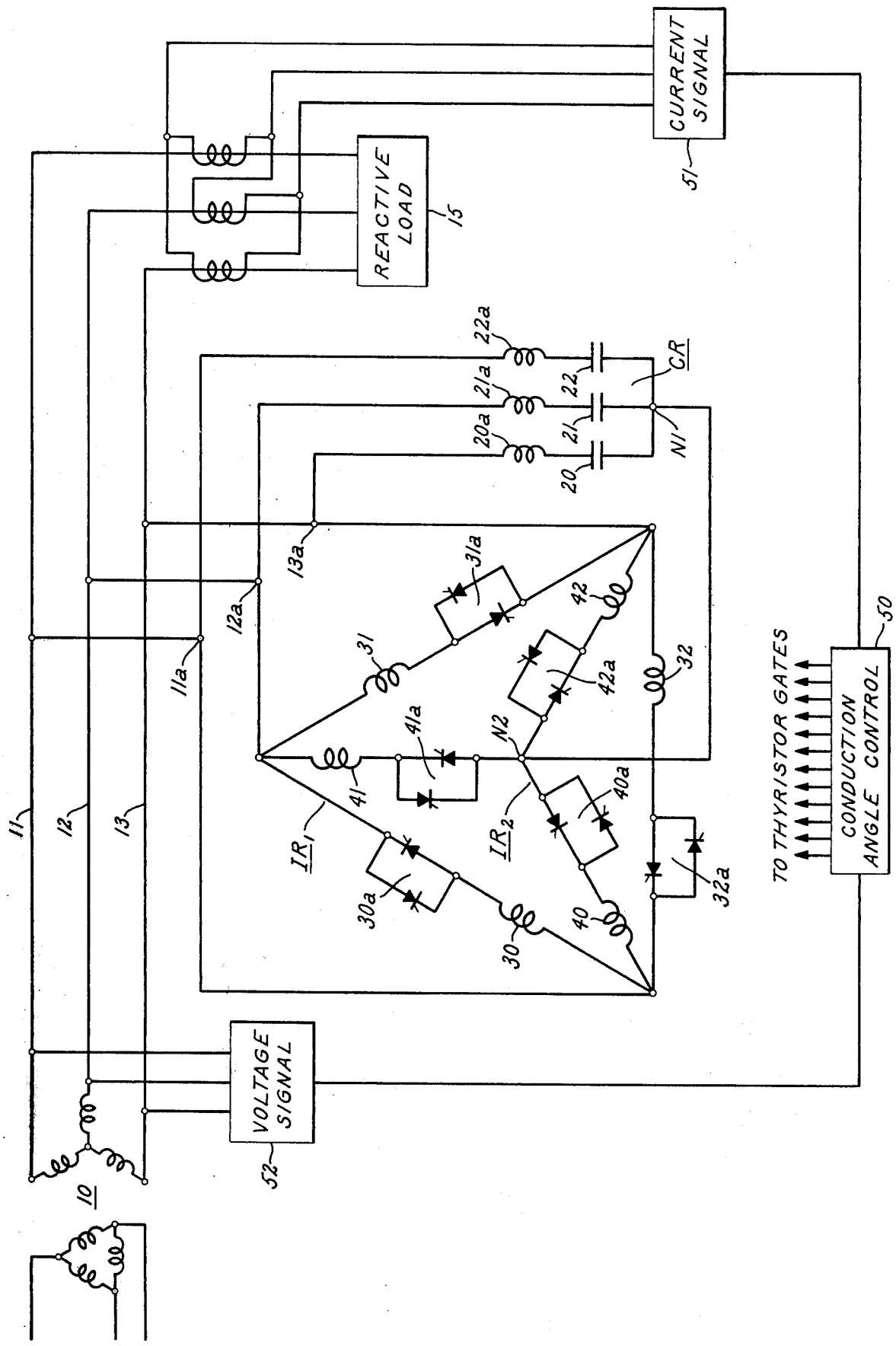

REACTIVE CURRENT COMPENSATING APPARATUS FOR ELECTRIC POWER SYSTEMS

My invention relates to reactive current compensating apparatus for improving voltage regulation in alternating current electric power systems. More particularly it relates to controllable static impedance means for selectively drawing leading or lagging reactive compensating current to control the power factor and stabilize voltage on electric power lines. The invention is especially applicable to power circuits having large inherent system reactance and to circuits supplying large reactive loads such as electric arc or induction furnaces and the like.

BACKGROUND

It is known that electric power systems which have large inherent system reactance and/or supply highly reactive loads are characterized by poor voltage regulation, i.e., substantial change in the magnitude of load voltage as load current increases. In a typical inductive circuit voltage magnitude and power factor both decrease as load current increases. To improve voltage regulation power transformers are commonly provided with tap changers to counteract the tendency of voltage magnitude to change with change in load current. Since most system loads are inductive it is known also to counteract the inductive current components of system load or of particular major loads by connecting compensating capacitance in series with or in shunt across power line conductors. Fixed capacitors may be used where load is reasonably predictable.

With certain variable and erratic major loads, such as electric arc and induction furnaces, controllable shunt capacitance has been provided by connecting rotating synchronous condensers or static capacitors directly across the load terminals in parallel with the load. The amount of capacitance must be varied as load current changes, for fixed capacitance would have the effect on no load of increasing load terminal voltage above the applied system voltage. The response time of rotating equipment is too slow however to prevent undesirable lamp flicker on the line as a result of load induced voltage variation. Similarly, mechanical switching means used for controlling static shunt capacitors does not respond sufficiently rapidly to prevent flicker. While it is known that solid state power switches may be made to respond within less than half a cycle of the power frequency, their use directly in circuit with compensating shunt capacitors is not entirely satisfactory; the leading capacitive current leaves residual charge in the capacitors and as a consequence troublesome transient voltages or harmonic frequencies are generated.

Several arrangements have recently been proposed for varying the net reactive current effect of fixed shunt compensating capacitors by connecting compensating inductors in parallel with the capacitors and varying the amount of reactive current traversing the inductors. This may be done by varying the magnitude of the shunt inductance across each line, as in patent 3,551,799-Keppleman, or by varying the amount of reactive current traversing shunt inductors of fixed magnitude, as in "Electric Technology U.S.S.R.", Vol. 1 Oct. 1969 pages 46–62 (Pergamon Press, October, 1969). Such an arrangement is shown in U.S. Pat. No. 3,936.727 - Kelley and Lezan.

I have discovered that when a three phase or other multiphase inductive compensating reactor including phase controlled alternating current static switches is connected to a power line in the manner illustrated in the foregoing Kelley & Lezan application a number of undesirable harmonic frequency currents are generated by phase control of current in the inductive compensating reactors. In a three phase reactor with bilaterally conductive static switches providing six current pulses per cycle the predominant harmonic frequencies are the 5th, 7th, 11th, 13th, 17th, 19th, 23rd and 25th harmonics of power system frequency. These harmonic frequencies $F_h$ may be expressed by the relation $F_h = 6K \pm 1$, where K is a positive integer. In a three phase inductive compensator of the static phase controlled type these characteristics exist whether the compensating inductors are delta connected or wye connected.

SUMMARY OF THE INVENTION

Accordingly, it is a general object of my invention to improve the harmonic current characteristics of static reactive current compensating apparatus.

It is a more particular object of my invention to reduce harmonic currents in inductive current compensating apparatus of the static phase controlled type.

In carrying out my invention in one preferred embodiment I connect a bank of fixed compensating capacitors across an alternating current power line or across the terminals of a major load having a large reactive current demand characteristic. In parallel with the fixed capacitors I connect two parallel banks of fixed inductors with the inductors of each phase in series with a phase controlled static switch. One parallel inductor bank is connected in delta or ring circuit relation and the second inductor bank is connected in wye or star circuit relation. Preferably the compensating capacitor bank is connected in wye or star circuit relation and its neutral point is connected to the neutral point of the wye or star connected inductor bank. By phase control of the six static switches the amount of inductive compensating current is controlled to counteract more or less of the capacitive compensating current. In this way the apparent inductive compensating reactance is controlled thereby to control the net effective reactance of the compensating capacitors and inductors. If the fixed capacitance is greater than the fixed inductance so that the net effective reactance is always capacitive the effect is that of variable capacitance. If the fixed inductance is greater than the fixed capacitance the net effective compensating reactance may be inductive. If desired each phase inductor in the inductive reactor banks may be divided into pairs of inductors with the associated static switch of that phase serially intermediate the divided phase inductor.

The static switches in each phase of my improved inductive compensating reactor banks may be controlled individually for each power circuit phase, in response to the reactive components of load current or in response to phase angle or power factor at a selected critical system bus location, or both, as is desired and claimed in the foregoing U.S. Pat. No. 3,936,727 Kelley et al.

My invention will be more fully understood and its several objects and advantages further appreciated by referring now to the following detailed description taken in conjunction with the accompanying drawing the single FIGURE of which is a schematic circuit diagram partially in block form, of an electric power system including relative current compensating means embodying my invention.

DETAILED DESCRIPTION

Referring now to the drawing I have illustrated a three phase electric power system comprising a source of voltage illustrated as a power transformer 10 having a secondary winding connected to distribution line conductors 11, 12 and 13. In a typical high voltage power system the transformer 10 may be connected on its primary side to a transmission line at a voltage of the order of 115 kV or 230 kV with its secondary winding providing line-to-line voltage of 34.5 kV at the conductors 11, 12 and 13. Connected to the line conductors 11, 12 and 13 I have illustrated in block form a highly reactive load circuit 15. Typically the load 15 would be inductive, and in the case of a highly inductive and erratically variable concentrated load, such as an electric arc furnace, reactive current compensating means are desirably associated directly with the load as illustrated in the drawing. It will of course be understood by those skilled in the art that such reactive current compensating means may also be utilized to improve the power factor of a multiphase alternating current transmission or distribution line apart from direct association with a single concentrated heavy load. The invention is however especially applicable to such heavy and erratic reactive loads and provides means for correcting unbalance of reactive load current as well as compensating for such current. In the case of an electric arc furnace the erratic nature of the arcs in the furnace load current may at times be severe.

It will of course be understood by those skilled in the art that a variety of other industrial, commercial and residential load circuits may be connected at both the primary and secondary sides of the transformer 10 and that reactive current compensating means embodying my invention may be connected at any desired point on the power system. For the purpose of illustration I have shown such a reactive current compensator connected to the distribution conductors 11, 12 and 13 between the load 15 and the step-down transformer 10.

In the three phase distribution circuit illustrated my improved reactive current compensator comprises a fixed capacitive reactor CR and two controllable inductive reactors $IR_1$ and $IR_2$. The capacitive reactor CR comprises three fixed capacitors 20, 21, 22 connected in wye circuit relation between a neutral point N1 and three reactor line terminals 11a, 12a and 13a. Preferably I provide in series circuit relation with the fixed capacitors tuning inductors 20a, 21a, 22a for the purpose of filtering or bypassing selected harmonic currents from the load circuit. Preferably the capacitive reactor CR comprises three separate wye-connected banks of fixed capacitors connected to the terminals 11a, 12a, 13a in parallel circuit relation, each bank being tuned to a different harmonic frequency, and particularly to the 3rd, 5th and 7th harmonics of the fundamental frequency. These are the predominant harmonics generated by the furnace arcs and by the phase controlled thyristor switches to be described hereinafter. By tuning each harmonic filter for series resonance at a selected frequency a low impedance bypass circuit is provided for that frequency so that harmonics generated in an arc furnace load or in the thyristor controlled reactors $IR_1$ and $IR_2$ do not enter the power circuit through the transformer 10.

In order to control the compensating effect of the capacitive compensating reactor CR I provide the two inductive reactors $IR_1$ and $IR_2$ each connected to the line terminals 11a, 12a, and 13a in parallel circuit relation with the load and the reactor CR. The inductive reactor $IR_1$ comprises a three phase bank of fixed inductors 30, 31, 32 connected in delta circuit relation through alternating current static switches 30a, 31a, 32a respectively, each phase reactor and associated static switch being in series circuit relation between a different pair of reactor line terminals 11a 12a, 13a. The inductive compensating reactor $IR_2$ comprises three fixed inductors 40, 41, 42 connected in wye circuit relation through associated alternating current static switches 40a, 41a, 42a respectively, each phase inductor being connected in series circuit relation with the associated static switch between a neutral point N2 of inductive reactor $IR_2$ and one reactor line terminal. Desirably the neutral point N2 of reactor $IR_2$ is connected to the neutral N1 of the capacitive reactor CR.

Each of the alternating current static switches 30a, 31a 32a, 40a, 41a, 42a comprises a pair of thyristors, or a pair of thyristor groups, connected in inverse parallel relation to conduct opposite half cycles of an alternating current. Such a switch is illustrated for example in U.S. Pat. No. 3,693,069-Kelley and Lezan. Each thyristor is provided with a gate lead, or control electrode, indicated schematically on the drawing in a manner well known to those skilled in the art. The reversely poled thyristors comprising each static switch are alternately rendered conductive on opposite half cycles of alternating voltage at selected controllable gating angles during half cycles of positive thyristor anode voltage. By controlling the gating angle, or delay angle, at which each thyristor is rendered conductive following the beginning of a positive voltage half cycle the conduction angle between that point and the next current zero is controlled, thereby to control the average magnitude of current traversing each thyristor switch and the associated phase inductor. Thus by appropriate application of gating pulses the thyristor switches may be phase controlled to vary current conduction through the associated fixed inductors from zero to a maximum. Zero conduction of course takes place when the thyristors of any switch are not gated so that no conduction is initiated; maximum conduction takes place when the thyristors of any switch are gated at the earliest possible gating angles to provide maximum conduction through the switch. In primarily inductive circuits such as the inductive reactors $IR_1$ and $IR_2$ the earliest available gating angle, measured from voltage zero in a positive half cycle of anode voltage, is 90°. As is well known any earlier gating angle will result in unequal conduction angles in the oppositely poled thyristors of a single switch and thus develop an undesirable DC current component. Desirably thyristor switches embodying conduction angle balancing means are utilized with my improved compensating reactor. Such balancing means are described and claimed, for example, in the foregoing U.S. Pat. No. 3,693,069-Kelley and Lezan and in U.S. Pat. No. 3,936,726 Kelley.

It will now be noted that when the thyristor switches of the inductive reactors $IR_1$ and $IR_2$ are completely non-conductive only the capacitive compensating reactor CR is in circuit across the load and only leading compensating current is drawn from the line. When the thyristor switches are fully conductive the inductive reactors are fully effective and draw a maximum predetermined amount of lagging reactive current which may be greater than, equal to or less than the amount of leading reactive current drawn by the capacitive reactor. Ordinarily it is sufficient that the vector sum of the leading and lagging reactive currents drawn by the capacitive and the inductive compensating reactors CR, $IR_1$ and $IR_2$ is a leading current and is maintained approximately equal in each line conductor to the lagging, or inductive, current component of furnace load current in that line under varying load conditions. When the inductive current in the load 15 is thus substantially balanced by an equal net capacitive current supplied by the combination of compensating reactors CR, $IR_1$ and $IR_2$ only the power, or resistive, component of load current appears on the line conductors 11, 12, 13. If in addition the inductive component of load current required by the transformer 10 is counteracted by the compensating reactors the entire load beyond the primary side of the transformer will appear to the system as a resistive load.

In some applications where it is desired to provide complete compensation for negative sequence components of current (i.e., unbalance) it is possible that the lagging component of compensating current in one or more phases may be required to exceed the leading components of compensating current in such phases, so that net inductive compensation is provided. By so designing the inductive reactors $IR_1$ and $IR_2$ that total inductive compensating current in any phases may be twice the magnitude of capacitive compensating current in the same phases of the reactor CR a control range is provided from a predetermined magnitude of capacitive compensating current to a like magnitude of inductive compensating current.

I have discovered that in operation my use of the dual parallel connected inductive compensating reactors $IR_1$ and $IR_2$ has the effect of eliminating many undesirable harmonic frequency currents in such phase controlled reactances. The characteristic harmonic currents generated in any one three phase bank of phase controlled inductors such as $IR_1$ or $IR_2$ are principally the 5th, 7th, 11th, 13th, 17th, 19th, 23rd and 25th harmonics of the fundamental. In any one three phase static switch assembly comprising six thyristors or thyristor groups these harmonics are described by the relation $F_h = 6K \pm 1$ where $F_h$ is a harmonic frequency and K is a positive integer.

I have discovered that when two three phase banks of phase controlled inductors are connected in parallel circuit relation with one bank delta connected and the other wye connected only those harmonics exist which are described by the relation $F_h = 12K \pm 1$. Thus the 5th, 7th, 17th, and 19th harmonics are eliminated.

In order to phase control the inductive current traversing the compensating reactors $IR_1$ and $IR_2$ I utilize a suitable conduction angle control apparatus 50 to provide 12 appropriately timed gate pulses, one for each of the 12 thyristors or thyristor groups shown in the drawing. The gating angle of pulses supplied to the thyristor switch in each phase arm of each inductive reactor is varied individually for each phase in accordance with input signals proportional to reactive current in the corresponding phase of the load circuit, as through a current signal sensor 51, and preferably also in accordance with power factor phase angle in each line of the power circuit, as by combining a voltage signal sensor 52. Such relative current and power factor control is fully described and claimed in the foregoing U.S. Pat. No. 3,936,727-Kelley et al.

While I have illustrated a preferred embodiment of my invention by way of illustration, many modifications will occur to those skilled in the art and I therefore wish to have it understood that I intend in the appended claims to cover all such modifications as fall within the true spirit and scope of my invention.

What I claim as new and desire to secure by Letters Patent of the United States is

1. Reactive current compensating apparatus for connection to a three phase alternating current electric power supply circuit in parallel with an electrical load which comprises, reactor line terminals for connection to said power supply circuit, three phase capacitor means including fixed capacitors connected to said line terminals in wye circuit relation to provide a first neutral terminal, first three phase inductor means connected to said line terminals in delta circuit relation, second three phase inductor means connected to said line terminals in wye circuit relation to provide a second neutral terminal, means conductively connecting said first and second neutral terminals, and means for separately controlling current magnitude in each phase of said first and second inductor means.

2. Reactive current compensating apparatus according to claim 1 and including gate controlled alternating current static switching means connected in series circuit relation with each phase inductor of said first and second inductor means.

3. In combination with the reactive current compensating apparatus of claim 2, line conductors for connection to said alternating current power supply circuit, a reactive load circuit connected to said line conductors, means connecting said line conductors to said reactor line terminals, and means responsive to the reactive components of load current in each power circuit phase for phase controlling said static switches in corresponding phases of said compensating apparatus to maintain in each phase of said compensating apparatus a net reactive compensating current substantially equal and opposite to said reactive load components in corresponding power circuit phases.

4. In combination with the reactive current compensating apparatus of claim 2, line conductors connecting said reactor line terminals to said power supply circuit, an electrical load connected to said line conductors, and means responsive to power factor at a selected point on said power circuit for phase controlling said static switches to maintain said power factor at a predetermined desired value.

5. Reactive current compensating apparatus for a multiphase alternating current electric power circuit which comprises, reactor line terminals for connection to each phase of said power circuit, a multiphase bank of fixed capacitors connected in star circuit relation between said reactor line terminals and a capacitor neutral terminal, a pair of multiphase banks of fixed inductors connected to said reactor line terminals, respectively, in star and ring circuit relation, means conductively connecting said capacitor neutral terminal to the neutral of said star connected fixed inductors, and means responsive to a characteristic of current in each phase of said power circuit for controlling the magnitude of current traversing a corresponding phase of fixed inductors.

6. Reactive current compensating apparatus according to claim 5 wherein the said bank of fixed inductors connected in star circuit relation provides a neutral terminal conductively connected to said capacitor neutral terminal.

* * * * *